April 28, 1959 — V. L. SCOTT — 2,883,963
PET COMMODE
Filed Sept. 23, 1957

INVENTOR
Vernah L. Scott
BY
ATTORNEY

_United States Patent Office_

2,883,963
Patented Apr. 28, 1959

2,883,963

PET COMMODE

Vernah L. Scott, Richardson, Tex.

Application September 23, 1957, Serial No. 685,680

4 Claims. (Cl. 119—1)

This invention relates to a pet commode, and it concerns more particularly a commode for house dogs.

In the care of house dogs it is usually necessary to let them out or take them for walks periodically, for the purpose of sanitation. This operation, often repeated, becomes a chore, and is sometimes found objectionable by the neighbors. The principal object of this invention is to provide a practical and serviceable commode for the use of house dogs.

Another object of the invention is to provide a pet commode including a receptacle having a sloping bottom, a drain pipe received in an opening provided therefor in the bottom, a pair of slotted plates pivotally connected to opposite sides of the receptacle above the bottom and inclined upwardly from their connected edges toward the middle of the receptacle, and a spray pipe extending across the middle of the receptacle, above and between the slotted plates, for use in flushing the receptacle.

Another object of the invention is to provide a pet commode of the type described in which the spray pipe comprises a straight section of pipe adapted to be connected to a flexible conduit and having means removably connecting it to opposite sides of the receptacle, the spray pipe having a plurality of longitudinally spaced discharge openings therein capable of directing streams of water downwardly and outwardly, in opposite directions, across the upper surfaces of the slotted plates.

A further object of the invention is to provide such a pet commode which is of simple, rugged construction, may be manufactured inexpensively, is efficient in use and is relatively durable.

The invention will be readily understood by referring to the following description and the accompanying drawing, in which.

Figure 1:
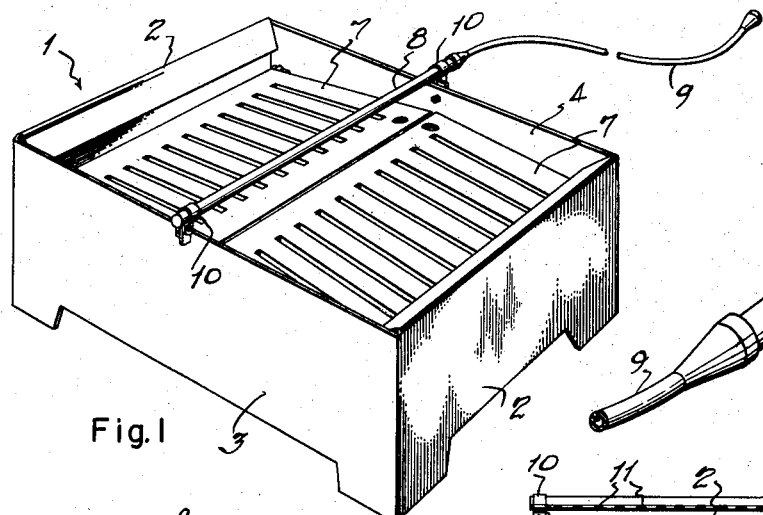
Figure 1 is a perspective view of a pet commode embodying the invention.
Figure 6:
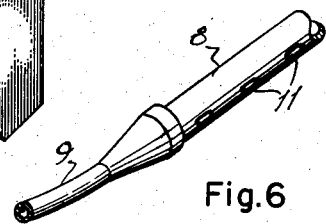
Figure 2:
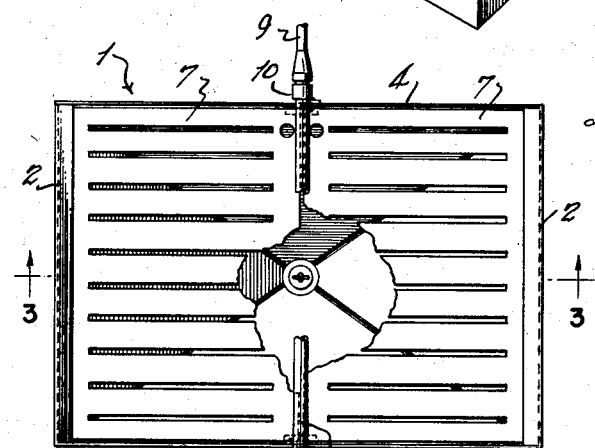
Figure 2 is a top plan view with the slotted plate partly broken.
Figure 4:
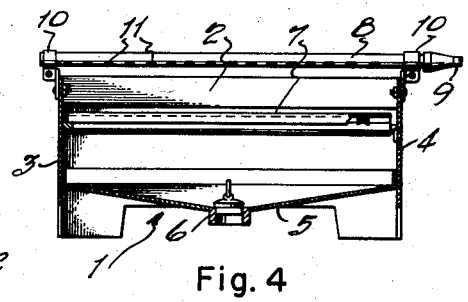
Figure 4 is a sectional elevational view taken on the lines 4—4 of Figure 3.
Figure 3:
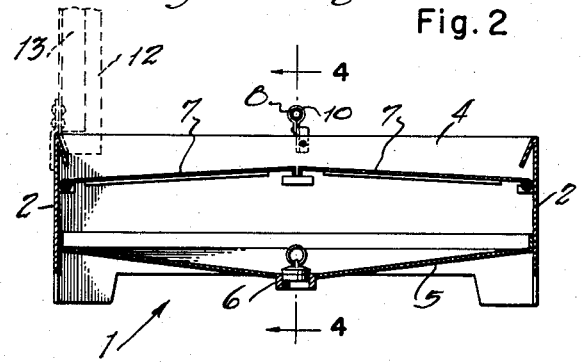
Figure 3 is a sectional elevational view taken on a median line.
Figure 5:
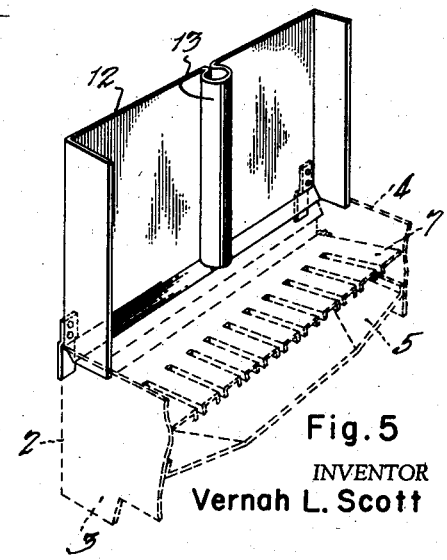

Figure 5 is a fragmentary perspective view of an optional arrangement, for the convenience of male dogs, in which one of the sides of the receptacle is provided with an upward extension removably connected thereto and forming an apron or shield, and having an upstanding member formed integrally therewith and simulating a post or fire plug; and Figure 6 is a fragmentary perspective view of a spray pipe for use in the apparatus of the invention.

Referring to the drawing, the pet commode of the invention includes a receptacle as hereinafter described, which is designated generally by the numeral 1. The receptacle 1 has a pair of side walls 2, a front wall 3, a rear wall 4, and a bottom 5. The bottom 5 slopes downwardly and inwardly toward its center. A drain pipe 6 is received in an opening provided therefor in the bottom 5.

The bottom 5 is spaced above the lower edges of the side walls 2, the front wall 3 and the rear wall 4. The arrangement is such that the receptacle 1 may be supported upon the floor or other convenient supporting surface.

The bottom 5 preferably is formed of lead or other material capable of resisting corrosion as well as the action of strong reagents.

A pair of slotted plates 7 are pivotally connected to opposite sides 2 of the receptacle 1, above the bottom 5. The slotted plates 7 are inclined upwardly from their connected edges toward the middle of the receptacle 1. A spray pipe 8 extends across the middle of the receptacle 1, above and between the slotted plates 7, for use in flushing the receptacle 1.

The spray pipe 8 comprises a straight section of pipe adapted to be connected to a flexible conduit 9 and having a pair of clamps 10 removably connecting it to the front wall 3 and the rear wall 4 of the receptacle 1. The spray pipe 8 has a plurality of longitudinally spaced discharge openings 11 therein capable of directing streams of water downwardly and outwardly, in opposite directions, across the upper surfaces of the slotted plates 7.

Figure 5 shows an optional arrangement, for the convenience of male dogs, in which one of the sides 2 of the receptacle 1 is provided with an upward extension 12 removably connected thereto and forming an apron or shield, and having an upstanding member 13 formed integrally therewith and simulating a post or fire plug.

The invention may be modified in various ways without departing from the spirit and scope thereof.

What is claimed is:

1. In a pet commode, the combination of a receptacle having a sloping bottom, a drain pipe received in an opening provided therefor in the bottom, a pair of slotted plates pivotally connected to opposite sides of the receptacle above the bottom and inclined upwardly from their connected edges toward the middle of the receptacle, and a spray pipe extending across the middle of the receptacle, above and between the slotted plates, for use in flushing the receptacle.

2. A pet commode as described in claim 1 in which the spray pipe comprises a straight section of pipe adapted to be connected to a flexible conduit and having means removably connecting it to opposite sides of the receptacle, the spray pipe having a plurality of longitudinally spaced discharge openings therein capable of directing streams of water downwardly and outwardly, in opposite directions, across the upper surfaces of the slotted plates.

3. In a pet commode, the combination of a receptacle having a sloping bottom, a drain pipe received in an opening provided therefor in the bottom, slotted plates positioned in the receptacle above the bottom, and a spray pipe positioned in the receptacle above the said plates for use in flushing the receptacle.

4. A pet commode as described in claim 3 having a removable wall, and in which both the slotted plates and the spray pipe are capable of being removed from the receptacle to facilitate cleaning.

References Cited in the file of this patent

UNITED STATES PATENTS

| | | |
|---|---|---|
| 1,773,141 | Hodgson | Aug. 19, 1930 |
| 1,813,329 | Supplee | July 7, 1931 |
| 2,204,416 | Kramer | June 11, 1940 |